US008924067B2

(12) United States Patent
Halder et al.

(10) Patent No.: US 8,924,067 B2
(45) Date of Patent: Dec. 30, 2014

(54) AUTONOMOUS MACHINE CONTROL SYSTEM

(75) Inventors: Bibhrajit Halder, Peoria, IL (US); Andrew J. Vitale, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1060 days.

(21) Appl. No.: 12/902,929

(22) Filed: Oct. 12, 2010

(65) Prior Publication Data
US 2012/0089293 A1  Apr. 12, 2012

(51) Int. Cl.
G05D 1/00 (2006.01)
B60W 50/02 (2012.01)
B60W 50/038 (2012.01)
B60W 50/029 (2012.01)
B60W 50/00 (2006.01)

(52) U.S. Cl.
CPC ... B60W 50/0205 (2013.01); *B60W 2050/0006* (2013.01); B60W 50/038 (2013.01); B60W 50/029 (2013.01)
USPC ............... 701/24; 701/23; 701/2; 701/50

(58) Field of Classification Search
CPC .................................. B60W 50/0205
USPC ............................. 701/2, 24, 23, 50
See application file for complete search history.

(56) References Cited

U.S. PATENT DOCUMENTS

| 5,469,356 | A | 11/1995 | Hawkins et al. |
| 5,548,516 | A * | 8/1996 | Gudat et al. ............ 701/23 |
| 6,972,669 | B2 | 12/2005 | Saito et al. |
| 7,427,914 | B2 | 9/2008 | Plantamura |
| 2004/0158355 | A1 * | 8/2004 | Holmqvist et al. ........ 700/245 |
| 2006/0212203 | A1 * | 9/2006 | Furuno ................... 701/50 |
| 2008/0208395 | A1 * | 8/2008 | Self et al. ................ 701/2 |
| 2009/0240481 | A1 | 9/2009 | Durrant-Whyte et al. |
| 2010/0052882 | A1 | 3/2010 | Sverrisson et al. |
| 2010/0063651 | A1 * | 3/2010 | Anderson ............... 701/2 |
| 2011/0071718 | A1 * | 3/2011 | Norris et al. ............ 701/23 |
| 2012/0089291 | A1 * | 4/2012 | Halder et al. ........... 701/23 |
| 2012/0089293 | A1 * | 4/2012 | Halder et al. ........... 701/24 |

FOREIGN PATENT DOCUMENTS

| EP | 0612916 | 8/1994 |
| EP | 1767708 | 3/2007 |
| EP | 1887148 | 2/2008 |
| JP | 08016235 | 1/1996 |

OTHER PUBLICATIONS

Application entitled "Autonomous Machine Control System" by inventors Bibhrajit Halder and Andrew J. Vitale filed on Oct. 12, 2010.

* cited by examiner

*Primary Examiner* — Thomas G Black
*Assistant Examiner* — Wae Louie
(74) *Attorney, Agent, or Firm* — Finnegan, Henderson, Farabow, Garrett & Dunner LLP

(57) ABSTRACT

An autonomous control system for a mobile machine is disclosed. The autonomous control system may have a plurality of system modules each configured to monitor a status of at least one machine component and generate a corresponding recommended machine action based on the status, and a control module configured to control operations of the mobile machine. The autonomous control system may also have a health supervisor module in communication with the plurality of system modules and the control module. The health supervisor module may be configured to arbitrate each of the recommended machine actions from the plurality of system modules to determine an overall machine response, and to command the control module to implement the overall machine response.

35 Claims, 3 Drawing Sheets

AUTONOMOUS MACHINE CONTROL SYSTEM

TECHNICAL FIELD

The present disclosure relates generally to a machine system and, more particularly, to an autonomous control system for a mobile machine.

BACKGROUND

Construction machines such as, for example, excavators, loaders, dozers, motor graders, haul trucks, and other types of heavy equipment are used to perform a variety of tasks. During the performance of these tasks, the machines can operate in situations that are hazardous to an operator, under extreme environmental conditions uncomfortable for the operator, or at work locations remote from civilization. In addition, some of the tasks require very precise and accurate control over operation of the machine that can be difficult for a human operator to provide. Some of the tasks are also very repetitive and fatiguing for an operator. Because of these factors, the completion of some tasks by an operator-controlled machine can be expensive, labor intensive, time consuming, and inefficient. Accordingly, autonomous machines are often utilized under harsh conditions or in critical and repetitive applications.

Autonomous machines are capable of operating with little or no human input by relying on information received from various machine systems. For example, based on brake system input, steering system input, engine system input, obstacle detection system input, tool system input, etc., an autonomous machine can be controlled to automatically complete a programmed task. By receiving feedback from each of the different machine systems during performance of the task, continuous adjustments to machine operation can be made that help to ensure precision and safety in completion of the task. In order to do so, however, the information provided by the different machine systems should be accurate and reliable, and the control system should be capable of dealing with abnormal or fault conditions of system components.

U.S. Pat. No. 5,469,356 issued to Hawkins et al. on Nov. 21, 1995 (the '356 patent) describes a machine control system that provides for autonomous maneuvering during detected fault conditions. Specifically, the '356 patent describes a vehicle information management system (VIMS) that provides for status monitoring of various vehicle systems. VIMS collects information from dedicated sensors onboard a vehicle and from an engine manager. In the event that VIMS detects a fault condition associated with one or more vehicle systems, VIMS determines a warning level indicative of the highest fault level present on the vehicle. The warning levels include a Level I warning indicative of a sensor reading being out of a normal operating range, a Level II warning indicative of a condition that could cause vehicle damage if not corrected, and a Level III warning indicative of immediate danger to the vehicle. VIMS provides this information to a machine navigation module that controls the vehicle to continue operations, slow operations, or stop operations based on the warning level.

Although the autonomous control system of the '356 patent may be operable during a fault condition, the centralized system may be cumbersome and limited. That is, because VIMS is responsible for directly collecting all information and determining all recommended actions based on the fault conditions of each machine system, the number of system inputs may be limited by a computing capacity of VIMS. In addition, as the number of machines system inputs increases, a control complexity of the system also increases, thereby making VIMS cumbersome.

The disclosed autonomous control system is directed to overcoming one or more of the problems set forth above and/or other problems of the prior art.

SUMMARY OF THE INVENTION

In one aspect, the present disclosure is directed to an autonomous control system for a mobile machine. The autonomous control system may include a plurality of system modules each configured to monitor a status of at least one machine component and generate a corresponding recommended machine action based on the status, and a control module configured to control operations of the mobile machine. The autonomous control system may also include a health supervisor module in communication with the plurality of system modules and the control module. The health supervisor module may be configured to arbitrate each of the recommended machine actions from the plurality of system modules to determine an overall machine response, and to command the control module to implement the overall machine response.

In another aspect, the present disclosure is directed to another autonomous control system for a mobile machine. This autonomous control system may include a plurality of system modules each configured to monitor a status of at least one machine component and generate a corresponding recommended machine action based on the status. The autonomous control system may also include a health supervisor module in communication with the plurality of system modules and configured to arbitrate each of the recommended machine actions from the plurality of system modules to determine an overall machine response. The autonomous control system may further include an offboard operator interface station in communication with the health supervisor module to receive the overall machine response and configured to provide a new route plan for the mobile machine when the overall machine response changes.

DETAILED DESCRIPTION

Figure 1:
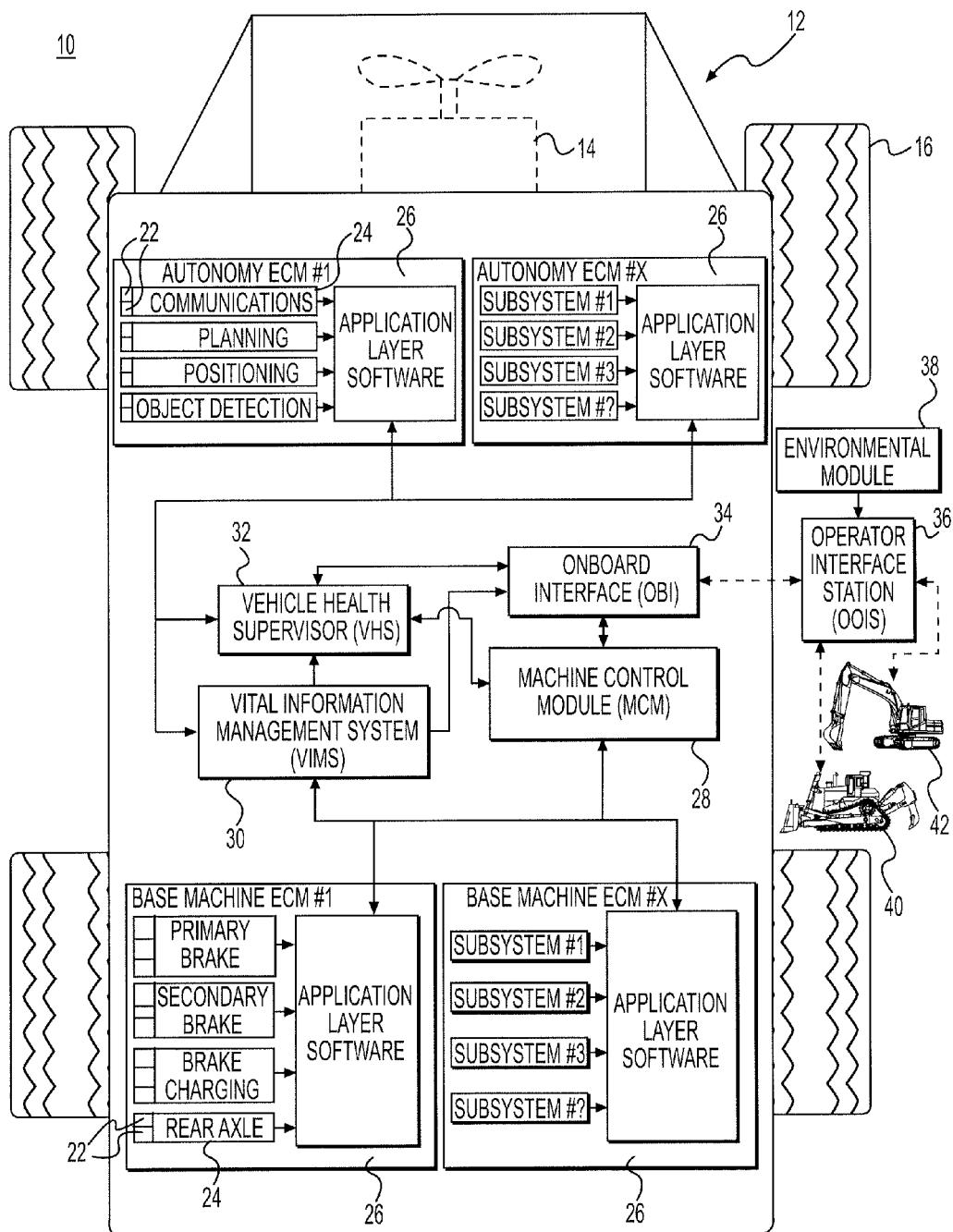
FIG. 1 is a pictorial illustration of an exemplary disclosed autonomous control system for a mobile machine.

FIG. 1 illustrates a worksite 10 and an exemplary machine 12 performing a task at worksite 10. Worksite 10 may include, for example, a mine site, a landfill, a quarry, a construction site, or any other type of worksite having a surface traversable by machine 12. The task being performed by machine 12 may be associated with altering the geography at worksite 10 and may include, for example, a hauling operation, a grading operation, a leveling operation, a plowing operation, a bulk material removal operation, or any other type of operation. As such, machine 12 may embody a mobile machine, for example a haul truck (shown in FIG. 1), a motor grader, a loader, or a snow plow. Machine 12 may include, among other things, a powertrain 14, one or more traction devices 16, a work tool 18, and an autonomous control system 20. Powertrain 14 may generate and provide power to move traction devices 16 and work tool 18, while autonomous control system 20 may regulate operations of powertrain 14, traction devices 16, and/or tool 18 in response to various input.

Powertrain 14 may be an integral package configured to generate and transmit power to traction devices 16 to propel machine 12. In particular, powertrain 14 may include a power source, for example a diesel, gasoline, or gaseous fuel-powered engine that is operable to generate a mechanical power output, and a transmission (not shown) connected to receive the mechanical power output and transmit the mechanical power output in a useful manner to traction devices 16 and/or work tool 18 via a final drive (not shown). In some applications, a torque converter (not shown) may be located between the power source and transmission or work tool 18 to selectively couple and decouple power transfer therebetween. It is contemplated that additional components may be included within powertrain 14, if desired.

Traction device 16 may be a wheel (shown in FIG. 1), a belt, a track or any other driven traction device known in the art. Traction device 16 may be driven by powertrain 14 to rotate and propel machine 12 in accordance with an output rotation of powertrain 14. A steering device (not shown), for example a hydraulic cylinder, a hydraulic motor, an electric motor, and/or a rack-and-pinion configuration may be associated with one or more traction devices 16 to affect steering thereof. In addition, a braking device (not shown), for example a compression disk brake, an internal fluid brake, an engine retarder, an exhaust brake, and/or a transmission brake may be associated with one or more traction devices 16 and/or powertrain 14 to affect braking of machine 12.

Numerous different work tools 18 may be attachable to a single machine 12 and controllable to perform a particular task. For example, work tool 18 may embody a haul bed (shown in FIG. 1), a ripper, a bucket, a blade, a shovel, or another task-performing device known in the art. Work tool 18 may be connected to machine 12 via a direct pivot, via a linkage system, via one or more hydraulic cylinders, via a motor, or in any other appropriate manner. Work tool 18 may pivot, rotate, slide, swing, lift, or move relative to machine 12 in any way known in the art.

Powertrain 14, traction devices 16, and work tool 18 may each include components 22 that facilitate control of machine 12. These components 22 may include, among other things, electronically controlled sensors, actuators, communication devices, and navigation devices. For example, machine 12 may be equipped with powertrain sensors such as engine speed sensors, engine temperature sensors, pressure sensors, flow meters, transmission shift sensors, transmission speed sensors, pump and motor displacement sensors, steering angle sensors, etc. Machine 12 may also be equipped with valve actuators, pump and motor displacement actuators, brake actuators, engine fueling actuators, transmission shifting actuators, steering actuators, and other actuators known in the art. Finally, machine 12 may be equipped with GPS receivers, local laser and/or radio positioning devices, cameras, wired and/or wireless data transmission equipment, and other communication and navigation equipment. Each of these components 22 may be configured to generate information used in manual and autonomous control of machine 12.

Components 22 may be grouped into a plurality of different subsystems 24, and classified as either base machine subsystems or autonomy subsystems. Base machine subsystems 24 may be subsystems 24 that includes components 22 required to run machine 12 regardless of whether machine 12 is being manually controlled or autonomously controlled. Some of these base machine subsystems 24 may include, for example, a primary braking subsystem, a secondary braking subsystem, a brake charging subsystem, a rear axle subsystem, a tool subsystem, a traction device monitoring subsystem, a steering charging subsystem, a primary steering subsystem, a secondary steering subsystem, a primary powertrain subsystem, a secondary powertrain subsystem, a lubrication subsystem, a payload subsystem, a machine control subsystem, and an electrical/charging subsystem. Autonomy subsystems may include subsystems 24 that consist of add-on components 22 that can be added to a base machine to allow for autonomous control of the machine. Some of these autonomy subsystems 24 may include, for example, an object detection subsystem, a positioning subsystem, an off-board communication subsystem, a planning subsystem, and an on-board communication subsystem. It is contemplated that additional and/or different subsystems 24 may be included within machine 12, if desired.

Each subsystem 24 may form a portion of autonomous control system 20 and be provided with an electronic control module (ECM) 26 that is configured to monitor a status of the different subsystems 24 and their respective components 22. That is, during operation of machine 12, feedback from each component 22 may be monitored and, depending on the feedback and a criticality of the component 22, a status of each corresponding subsystem 24 may be classified by the respective ECM 26 into one of multiple different categories. In one example, the categories may include Fully Functional, Failed But Functional, and Failed And Non-Functional. It is contemplated that other or additional categories may be utilized, if desired. The status of a subsystem 24 may be classified by the associated ECM 26 as Fully Functional when feedback from the associated grouped components 22 is indicative of operation within acceptable ranges. The status may be classified as Failed But Functional when feedback from components 22 is indicative of operation outside of the acceptable ranges. The status may be classified as Failed And Non-Functional when feedback from associated components 22 is either not received or indicates no operation at all. Each ECM 26 may receive feedback from its associated components 22 and determine the corresponding status of each related subsystem 24.

Based on the status of the related subsystems 24, each ECM 26 may be configured to generate a recommended machine action. The recommended machine action may increase in severity by steps and include, among other things, a recommendation to Allow Normal Operation, a recommendation to Limit Machine Operation (e.g., to limit travel speed or work tool movement), a recommendation to Stop all movement of machine 12, and a recommendation to Stop all machine movement and Turn Off machine 12. The different recommended actions associated with each subsystem 24 may be directed by the respective ECM 26 to a centralized machine control module (MCM) 28, while the status of each component 22 may be directed to a Vital Information Management System (VIMS) 30. In some embodiments, the recommended actions are sent to only MCM 28, while the status of components 22 is sent to only VIMS 30. This communication arrangement may help to simplify MCM 28 and VIMS 30.

MCM 28 may be configured to adjust operation of the different components 22 based on either manual input or autonomous input and based on feedback from components 22. That is, MCM 28 may communicate with components 22 of powertrain 14, traction devices 16, and/or work tool 18 via commands directed through base machine and autonomy subsystem ECMs 26 to cause machine 12 to speed up, slow down, stop, turn, travel forward, travel backward, idle, dump, rack-back, shift gears, etc., based on operator commands and/or in response to a desired travel path or excavation cycle. MCM 28 may rely on feedback from different components 22 during control of machine 12 to determine adjustments in the operation of machine 12 necessary to accomplish a particular task. MCM 28 may be configured to receive control instructions relating to operation of machine 12 from a vehicle health supervisor (VHS) 32 and an onboard interface (OBI) 34. MCM 28 may be configured to pass the different recommended actions from each subsystem ECM 26 on to VHS 32 and to OBI 34. It is also contemplated that the different recommended actions associated with each subsystem 24 may be sent from ECMs 26 directly to VHS 32 and OBI 34 without first passing through MCM 28, if desired. It should be noted that only the recommended actions may be passed to VHS 32 (i.e., the status of each component 22 and subsystem 24 may not be passed to VHS 32), thereby allowing for reduced computing complexity within VHS 32.

VIMS 30 may provide status recording and diagnostic functionality. That is, VIMS 30 may receive the status information from each component 22 and subsystem 24, and be configured to time-index and record the provided information. During subsequent diagnostic routines, VIMS 30 may then be able to recall particular portions of the information, as directed. VIMS 30 may pass the recorded and/or recalled information on to VHS 32 and/or to OBI 34.

VHS 32 may be configured to arbitrate the different recommended machine actions received from MCM 28 and determine an overall machine response directed back to MCM 28 for implementation. For the purposes of this disclosure, the term arbitrate may be considered the determination of the overall machine response based on evaluation of each of the recommended actions such that one or more machine goals of efficiency, durability, productivity, and maintenance may be achieved. In one situation, VHS 32 may reference each recommended action and the corresponding subsystem 24 contributing to the recommended action with a lookup map contained in memory to determine a specific overall machine response. In another situation, the most severe recommended action may simply be used as the overall machine response. In yet other situations, a combination of recommended actions of a lower severity level may be used to determine (e.g., to calculate according to one or more predefined algorithms) an overall machine response at a higher severity level. For instance, if the primary steering and the primary braking subsystems 24 are both recommending that machine 12 be slowed, VHS 32 may determine the actions are additive in severity and the overall response should be to stop machine 12. In a similar example, if primary steering subsystem 24 is recommending slowing machine travel speed to 10 mph and primary braking subsystem 24 is recommending slowing machine travel speed to 5 mph, VHS 32 may determine that the overall response should be to slow machine travel even further to a speed of 3 mph. After determining the overall machine response, VHS 32 may direct the response back to MCM 28 for implementation, during which MCM 28 may command specific actions by the appropriate components 22 of subsystems 24. It is contemplated that VHS 32 may communicate the overall machine response directly with MCM 28 or indirectly via a planning subsystem module, if desired.

VHS 32 may also direct the overall machine response and an identification of the subsystem(s) 24 contributing to the response to an offboard operator interface station (OOIS) 36 via OBI 34. OBI 34 may embody a communications module that facilitates communications between machine 12 and OOIS 36. The overall machine response communicated to OOIS 36 may, in some situations, require or provide an opportunity for input from a human operator. For example, if the recommended response is to slow, stop, and/or turn off machine 12, an alert may be provided to OOIS 36 along with the overall machine response, asking for acknowledgment from the operator. The alert may continue to be sent to OOIS 36 until acknowledgement is received. In another example, after an overall response of stopping and turning off machine 12 has been implemented, a manual override from OOIS 36 may be required before machine 12 may be restarted. In yet another example, when the overall machine response is communicated to OOIS 36, an operator may have the opportunity to override the response before it is implemented and invoke a less or more severe response, as desired. Accordingly, in some situations, OOIS 36 may provide instructions back to machine 12 via OBI 34 regarding the overall response proposed and/or implemented by VHS 32.

The overall machine response may be used to control operations of machine 12 until a different response is produced by VHS 32 and received by MCM 28 or until the overall response has been manually overridden via communications passed from OOIS 36 through OBI 34. That is, as long as the same or a similar combination of recommended actions from the same or a similar combination of subsystem ECMs 26 is directed to VHS 32, VHS 32 may maintain the same overall machine response directed to MCM 28. Once the recommended actions from subsystems 24 contributing to the overall machine response change in number or severity, VHS 32 may re-evaluate the recommendations and determine a new overall response. For example, if a brake sensor were to stop generating signals, the primary brake subsystem 24 may produce a status of Failed and Non-Functional that is directed through MCM 28 to VHS 32. At this same time, an engine temperature sensor may produce abnormal signals, and the primary engine subsystem 24 may produce a status of Failed but Functional. Based on these different status levels, the corresponding ECMs 26 may produce recommended actions to stop and slow Machine 12, respectively. From this information, VHS 32 may determine that the most severe recommended action should be utilized as the overall machine response and, accordingly, command MCM 28 to stop machine 12. After a period of time, however, the brake sensor may begin generating normal signals and cause a change in status to Fully Functional, thereby resulting in the recommend action from primary brake subsystem 24 to allow normal operation. Under these conditions, VHS 32 may then base the overall machine response on the next most severe recommended action (i.e., on the recommend provided by the primary engine subsystem 24) and command MCM 28 to slow machine 12. Alternatively, VHS 32 may be manually overridden at any time via OOIS 36 to change the overall machine response (i.e., to increase a severity of the response).

In some situations, the actions recommended by ECMs 26 may change before or during completion of the corresponding overall machine response. For example, the status of a particular component that contributed to an overall machine response of stopping and turning off machine 12 could change before machine 12 comes to a complete stop and is turned off. In these situations, VHS 32 may be configured to confirm completion of the overall machine response before changing the overall machine response, regardless of the change in the recommended actions. In addition, VHS 32 may also be required to obtain operator permission via OOIS 36 to switch between particular overall machine responses. In this manner, a stability of machine 12 may be enhanced.

It is contemplated that recommended actions may also come from offboard machine 12, if desired. Specifically, autonomous control system 20 may be equipped with one or more offboard control modules, for example an environmental control module 38. Environmental control module 38 may be configured to obtain information regarding the environment in which machine 12 is operating, and generate recommended actions based on this information. For example, environmental control module 38 may collect information regarding a road quality, a visibility, traffic conditions, precipitation, etc., and based on this information, recommend that machine 12 be allowed to operate normally, slow down, stop, or stop and turn off. These recommendations may be directed to VHS 32 via OOIS 36 and OBI 34 for consideration in determining the overall machine response.

OBI 34 may facilitate communications between OOIS 36 and VHS 32, VIMS 30, and MCM 28. OBI 34 may include hardware and/or software that enables sending and receiving of data messages through a direct data link and/or a wireless communication link, as desired. The direct data link may include an Ethernet connection, a connected area network (CAN), or another data link known in the art. The wireless communications may include satellite, cellular, infrared, and any other type of wireless communications that enable OBI 34 to exchange information with onboard and offboard control modules.

OOIS 36 may communicate with vehicle health supervisors 32 of multiple different machines 12 at worksite 10. Specifically, OOIS 36 may allow for a single operator or team of operators to provide tailored instruction to multiple autonomously controlled machines 12 and thereby selectively affect the overall response that each machine 12 implements when encountering a fault condition within a particular subsystem 24. In the disclosed embodiment, OOIS 36 is shown as communicating with a haul truck (machine 12), a dozer 40, and an excavator 42. It is contemplated, however, that OOIS 36 may communicate with any number and type of machine 12, as desired.

Based on the overall machine response, OOIS 36 may be configured to provide a new assignment or goal for machine 12. The assignment may include a change in travel route, a different destination, or even a different task. For example, if machine 12 has been given the overall response of slowing down, OOIS 36 may direct machine 12 onto an alternative path away from other machines 12 at worksite 10 such that the now-slower machine 12 does not cause traffic congestion. In this manner, OOIS 36 may help to ensure productivity and safety of all machines 12 at worksite 10.

Each of controllers/control modules 26-38 of machine 12 may be configured to follow an emergency procedure in the event of a communication failure with another module. The particular procedure for each control module 26-38 may be different, and tailored according to machine type, machine size, operator preference, module criticality, or in another manner. In one example, VHS 32 may be configured to command MCM 28 to stop and turn off machine 12 when recommended actions are not received from the ECMs 26 of particular subsystems 24 that have been classified as critical subsystems 24.

Each of ECMs 26, MCM 28, VIMS 30, VHS 32, OOIS 36, and environmental control module 38 may embody a single or multiple microprocessors, field programmable gate arrays (FPGAs), digital signal processors (DSPs), etc., that include a means for controlling an operation of machine 12. Numerous commercially available microprocessors can be configured to perform the functions of these components. It should be appreciated that each of these components could readily embody a microprocessor separate from that controlling other machine-related functions, or that they could be integral with a machine microprocessor and be capable of controlling numerous machine functions and modes of operation. If separate from the general machine microprocessor, each of these components may communicate with the general machine microprocessor via datalinks or other methods. Various other known circuits may be associated with these components, including power supply circuitry, signal-conditioning circuitry, actuator driver circuitry (i.e., circuitry powering solenoids, motors, or piezo actuators), and communication circuitry.

Figure 2:
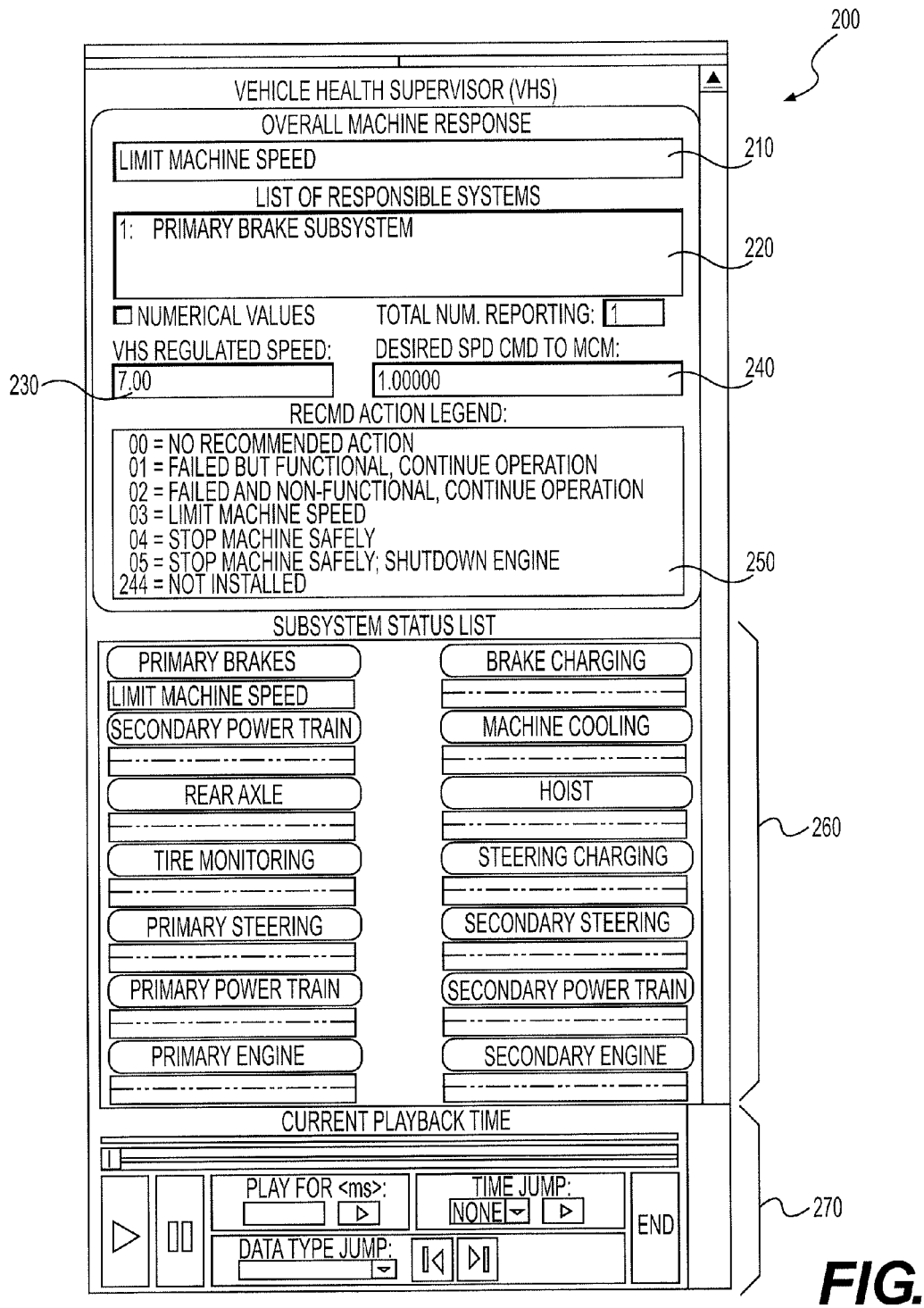
FIG. 2 is a pictorial illustration of an exemplary disclosed graphics user interface that may be used with the autonomous control system of FIG. 1.

FIG. 2 illustrates a graphics user interface (GUI) 200 intended for use at OOIS 36. GUI 200 may include a plurality of fields configured to provide information to a user regarding operations of machine 12. Some or all of these same fields may also be configured to receive information, for example instructions, from an operator. For instance, an operator using a mouse, a light stick, a tab button, or another pointing device, may click into a particular field and then enter instructions using a drop down menu and/or a keyboard. The instructions may be sent to VHS 32 via OOIS 36 and OBI 34. In the exemplary disclosed GUI 200, an overall machine response field 210, a responsible subsystem field 220, a regulated speed field 230, a desired speed field 240, a recommended action legend 250, a subsystem status list 260, and a virtual control field 270 may be included. It is contemplated, however, that additional or different fields may be included within GUI 200, as desired.

Overall machine response field 210 may be configured to display the arbitrated machine action currently being implemented on machine 12 (i.e., to display the overall machine response determined by VHS 32 and implemented by MCM 28). Responsible subsystem field 220 may be configured to display a list of which of subsystems 24 is contributing to the overall machine response. Regulated speed field 230 may be configured to display a speed limit associated with the overall machine response. Desired speed field 240 may be configured to display a current machine speed command. Recommended Action Legend 250 may display an explanation of different possible machine responses. Subsystem status list 260 may be configured to display different machine actions recommended by subsystems 24, from which the overall machine response is determined. Virtual controls 270 may be configured to allow a user to regulate playback of machine operation that was previously recorded by VIMS 30.

Figure 3:
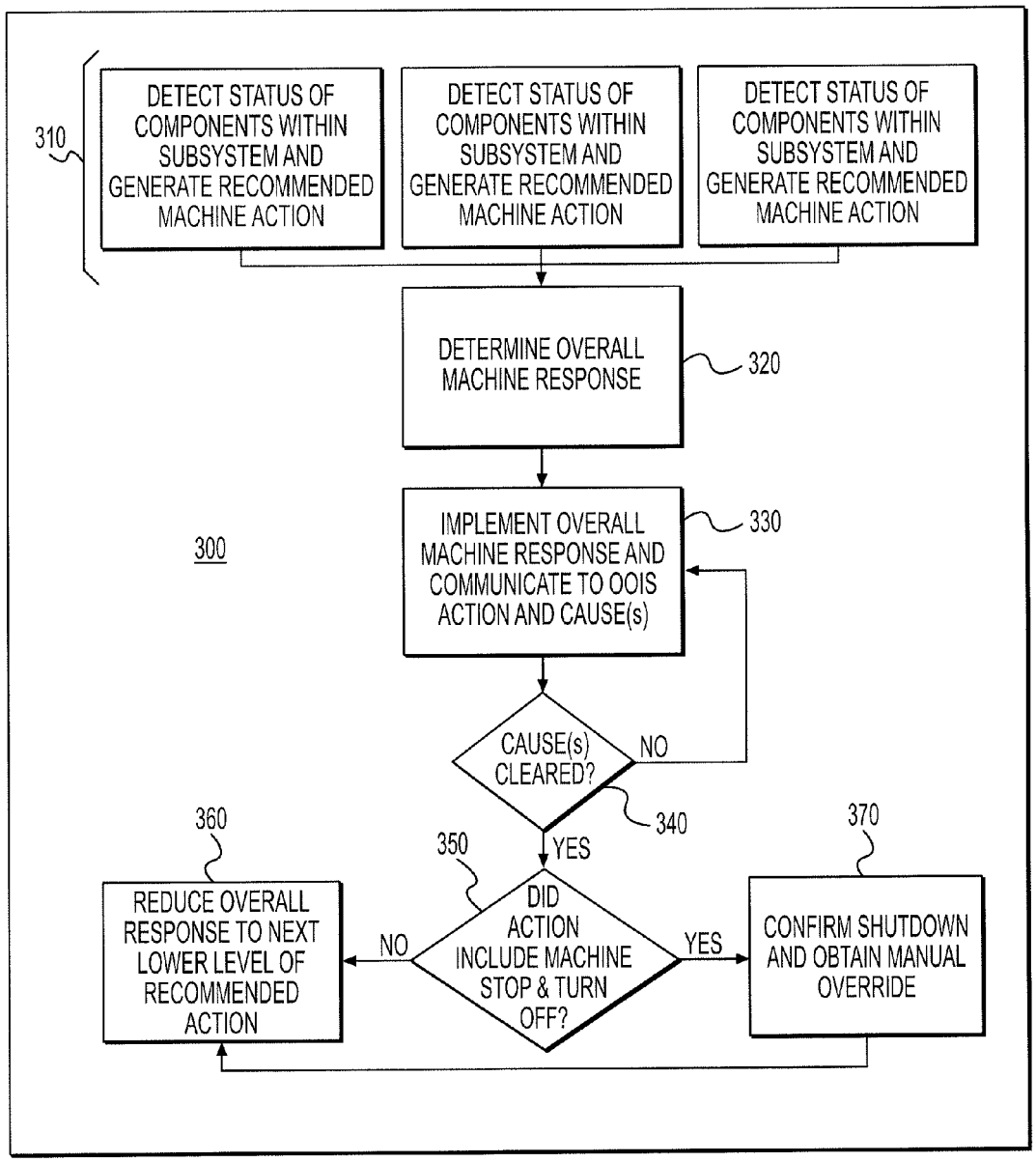
FIG. 3 is a flowchart depicting an exemplary disclosed method performed by the autonomous control system of FIG. 1.

FIG. 3 illustrates an exemplary method stored as instructions on a computer readable medium 300 that are executable by autonomous control system 20 to control machine 12. FIG. 3 will be discussed in more detail in the following section to further illustrate the disclosed concepts.

INDUSTRIAL APPLICABILITY

The disclosed machine control system may be applicable to any mobile machine where autonomy is desired. The disclosed system may provide for reliable autonomous machine control through a unique distributed architecture that simplifies computing, provides flexibility, and helps to ensure safe and reliable operation during fault conditions. Operation of autonomous control system 20 will now be described with respect to the method of FIG. 3.

As can be seen from FIG. 3, the exemplary method of autonomous machine control may begin with status detection of components 22 in each subsystem 24 and machine action recommendations by each corresponding ECM 26 (Step 300). That is, each ECM 26 may monitor the operation of each component 22 for which the particular ECM 26 is responsible. Based on the monitored status of each component 22, each ECM 26 may generate one of several machine action recommendations, including allowing machine 12 to operate normally, slowing machine 12, stopping machine 12, and stopping and turning off machine 12.

VHS 32 may receive each recommended machine action and determine an overall machine response (Step 320). In one embodiment, the response may be determined through the use of relationship maps, equations, and/or algorithms stored within an internal memory of VHS 32. In another embodiment, VHS 32 may rank the different recommended machine actions according to severity, and utilize the most severe recommended machine action as the overall machine response. In yet another embodiment, the overall machine response may be received from an offboard user via OOIS 36 and OBI 34. VHS 32 may command MCM 28 to implement the overall machine response, and also send an alert of the response to OOIS 36 via OBI 34 (Step 330).

VHS 32 may continue to monitor the recommended machine actions from each ECM 26 to determine if the subsystem(s) 24 contributing to the overall machine response has changed the status of a particular component 22 (e.g., to determine if the fault condition contributing to the overall machine response has been cleared) (Step 340). If the subsystem(s) 24 contributing to the overall machine response has changed status, VHS 32 may re-evaluate the overall machine response and make adjustments if necessary.

VHS 32 may perform differently if the overall machine response included stopping and turning off machine 12. For example, if a fault condition previously contributing to the overall machine response has been cleared and VHS 32 determines that the overall machine response did not include stopping and turning off machine 12 (Step 350), VHS 32 may reduce the overall response, for example, to the next level of recommended action having a lower severity. If, however, at step 350, VHS 32 determines that the overall machine response included stopping and turning off machine 12, VHS 32 may first confirm that the overall machine response has been fully implemented before reducing the overall response (Step 360). In some embodiments, VHS 32 may also be required to first obtain a manual override following the stopping and turning off of machine 12 before reducing the overall response (Step 370).

Several benefits may be associated with the disclosed autonomous control system. For example, the disclosed autonomous control system may be simple and have increased computing capacity and application. That is, because each ECM 26 may pass only recommended actions to VHS 32 (as opposed to a status of every component 22), the computing demand from and complexity of VHS 32 may be relatively low. In addition, the number of component inputs may be limited less by a capacity of VHS 32. Further, because VHS 32 may not require VIMS 30 to autonomously control machine 12 (i.e., because VIMS 30 may be utilized to only record machine operations for subsequent playback), the disclosed autonomous control system may be easily retrofittable to machines 12 that do not include VIMS 30.

It will be apparent to those skilled in the art that various modifications and variations can be made to the autonomous control system of the present disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. An autonomous control system for a mobile machine, comprising:
    a plurality of system modules each configured to autonomously:
        monitor a status of at least one machine component and generate a corresponding recommended machine action based on the status;
    a control module configured to autonomously control operations of the mobile machine; and
    a health supervisor module in communication with the plurality of system modules and the control module, the health supervisor module configured to autonomously:
        arbitrate each of the recommended machine actions from the plurality of system modules to determine an overall machine response; and
        command the control module to implement the overall machine response.

2. The autonomous control system of claim 1, further including an offboard operator interface station, wherein the health supervisor module is further configured to communicate with the offboard operator interface station the overall machine response and which of the plurality of subsystems contributed to the overall machine response.

3. The autonomous control system of claim 2, wherein the offboard operator interface station is in communication with the health supervisor module of a plurality of different mobile machines.

4. The autonomous control system of claim 3, wherein the overall machine response is based on a recommended action having a highest severity level.

5. The autonomous control system of claim 4, wherein the health supervisor module is configured to cause the control module to maintain the overall machine response until the highest severity level of the recommended actions has been reduced or the offboard operator interface station provides a manual override command.

6. The autonomous control system of claim 5, wherein, when the overall machine response includes turning off the mobile machine, the health supervisor module is configured to confirm that the mobile machine has been turned off before changing the overall machine response, even if the recommended actions change before the mobile machine has been turned off.

7. The autonomous control system of claim 6, wherein the offboard operator interface station is configured to provide a new route plan for the mobile machine when the overall machine response changes.

8. The autonomous control system of claim 1, wherein the overall machine response is based on a combination of recommended actions and a severity level of each recommended action of the combination.

9. The autonomous control system of claim 1, wherein the plurality of system modules includes a plurality of base machine modules and a plurality of autonomy modules.

10. The autonomous control system of claim 1, wherein the control module is in direct communication with each of the plurality of system modules and configured to implement the overall machine response by directing corresponding commands to the plurality of system modules.

11. The autonomous control system of claim 1, further including an information management system in communication with each of the plurality of system modules and with the health supervisor module, the information management system configured to record at least one of the status of the at least one component of each of the plurality of system modules, the corresponding recommended machine actions, and the overall machine response.

12. The autonomous control system of claim 11, wherein the status of the at least one component of each of the plurality of system modules is sent from the plurality of system modules to only the information management system.

13. The autonomous control system of claim 11, further including an onboard interface module configured to relay communications between the offboard operator interface station and the health supervisor module, information management system, and machine control module.

14. The autonomous control system of claim 1, wherein the health supervisor module is configured to follow an emergency procedure in the event of miscommunication with the plurality of system modules.

15. The autonomous control system of claim 14, wherein the emergency procedure is to command the control module to stop the mobile machine or to stop and turn off the mobile machine depending on which of the plurality of system modules is experiencing the miscommunication.

16. The autonomous control system of claim 1, further including an offboard environmental module configured to provide an additional recommended machine action to the health supervisor module based on environmental conditions affecting machine operation, wherein the health supervisor module is further configured to consider the additional recommended machine action from the environmental module when determining the overall machine response.

17. The autonomous control system of claim 1, wherein the at least one component is one of an actuation component, a sensing component, and a communication component.

18. The autonomous control system of claim 1, wherein the overall machine response includes at least one of allowing normal machine operation, slowing the mobile machine, stopping the mobile machine, and turning off the mobile machine.

19. The autonomous control system of claim 1, wherein each of the plurality of system modules continuously generates a recommended machine action.

20. The autonomous control system of claim 1, wherein the plurality of system modules includes one or more of a brake system module, a steering system module, an powertrain system module, a tool system module, and a guidance system module.

21. An autonomous control system for a mobile machine, comprising:
    a plurality of system modules each configured to autonomously:
        monitor a status of at least one machine component and generate a corresponding recommended machine action based on the status;
    a health supervisor module in communication with the plurality of system modules and configured to autonomously arbitrate each of the recommended machine actions from the plurality of system modules to determine an overall machine response; and
    an offboard operator interface station in communication with the health supervisor module to receive the overall machine response and configured to provide a new route plan for the mobile machine when the overall machine response changes.

22. The autonomous control system of claim 21, wherein the health supervisor module is further configured to communicate with the offboard operator interface station which of the plurality of subsystems caused the overall machine response.

23. The autonomous control system of claim 22, wherein the offboard operator interface station is in communication with the health supervisor module of a plurality of different mobile machines.

24. The autonomous control system of claim 23, wherein the overall machine response is based on a recommended action having a highest severity level.

25. The autonomous control system of claim 24, wherein the health supervisor module is configured to maintain the overall machine response until the highest severity level of the recommended actions has been reduced or the offboard operator interface station provides a manual override command.

26. The autonomous control system of claim 25, wherein, when the overall machine response includes turning off the mobile machine, the health supervisor module is configured to confirm the mobile machine has been turned off before changing the overall machine response, even if the recommended actions change before the mobile machine has been turned off.

27. The autonomous control system of claim 21, wherein the overall machine response is based on a combination of recommended actions and a severity level of each recommended action of the combination.

28. The autonomous control system of claim 21, wherein the plurality of system modules includes a plurality of base machine modules and a plurality of autonomy modules.

29. The autonomous control system of claim 21, further including an information management system in communication with each of the plurality of system modules and with the health supervisor module, the information management system configured to record at least one of the status of the at least one component of each of the plurality of system modules, the corresponding recommended machine actions, and the overall machine response.

30. The autonomous control system of claim 21, further including an offboard environmental module configured to provide an additional recommended machine action to the health supervisor module based on environmental conditions affecting machine operation, wherein the health supervisor module is further configured to consider the additional recommended machine action from the environmental module when determining the overall machine response.

31. The autonomous control system of claim 21, wherein the at least one component is one of an actuation component, a sensing component, and a communication component.

32. The autonomous control system of claim 21, wherein the overall machine response includes at least one of allowing normal machine operation, slowing the mobile machine, stopping the mobile machine, and turning off the mobile machine.

33. The autonomous control system of claim 21, wherein each of the plurality of subsystems continuously generates a recommended machine action.

34. The autonomous control system of claim 21, wherein the plurality of system modules includes one or more of a brake system module, a steering system module, an powertrain system module, a tool system module, and a guidance system module.

35. An autonomous machine, comprising:
    a powertrain;
    a traction device driven by the powertrain; and
    an autonomous control system including:
        a plurality of system modules each configured to autonomously:

monitor a status of at least one machine component and generate a corresponding recommended machine action based on the status;
a control module configured to autonomously control operations of the powertrain and traction device to steer and propel the autonomous machine; and
a health supervisor module in communication with the plurality of system modules and the control module, the health supervisor module configured to autonomously:
  arbitrate each of the recommended machine actions from the plurality of system modules to determine an overall machine response; and
  command the control module to implement the overall machine response.

* * * * *